US008848905B1

(12) United States Patent
Hamlet et al.

(10) Patent No.: US 8,848,905 B1
(45) Date of Patent: Sep. 30, 2014

(54) DETERRENCE OF DEVICE COUNTERFEITING, CLONING, AND SUBVERSION BY SUBSTITUTION USING HARDWARE FINGERPRINTING

(75) Inventors: Jason R. Hamlet, Albuquerque, NM (US); Todd M. Bauer, Albuquerque, NM (US); Lyndon G. Pierson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 779 days.

(21) Appl. No.: 12/844,860

(22) Filed: Jul. 28, 2010

(51) Int. Cl.
| H04K 1/04 | (2006.01) |
| H04K 1/06 | (2006.01) |
| H04L 9/00 | (2006.01) |
| H04L 9/32 | (2006.01) |

(52) U.S. Cl.
CPC .. *H04K 1/04* (2013.01); *H04K 1/06* (2013.01); *H04L 9/00* (2013.01); *H04L 9/3278* (2013.01)
USPC ................................. 380/35; 726/20; 713/176

(58) Field of Classification Search
CPC .............. H04K 1/04; H04K 1/06; H04L 9/00; H04L 9/3278
USPC ......................... 380/35, 255; 726/20; 713/176
See application file for complete search history.

(56) References Cited

U.S. PATENT DOCUMENTS

| 3,786,439 | A | * | 1/1974 | McDonald et al. ............ 714/702 |
| 5,963,144 | A | * | 10/1999 | Kruest ......................... 340/10.1 |
| 6,009,549 | A | * | 12/1999 | Bliss et al. ...................... 714/769 |
| 7,370,190 | B2 | | 5/2008 | Calhoon et al. |
| 7,681,103 | B2 | * | 3/2010 | Devadas et al. ............... 714/752 |
| 7,702,927 | B2 | * | 4/2010 | Devadas et al. ............... 713/194 |
| 7,898,283 | B1 | * | 3/2011 | Koushanfar et al. .............. 326/8 |
| 8,198,641 | B2 | * | 6/2012 | Zachariasse .................... 257/81 |
| 8,260,708 | B2 | * | 9/2012 | Potkonjak ....................... 705/52 |
| 8,510,608 | B2 | * | 8/2013 | Futa et al. ....................... 714/52 |
| 2003/0204743 | A1 | | 10/2003 | Devadas et al. |
| 2006/0209584 | A1 | * | 9/2006 | Devadas et al. ................. 365/52 |
| 2006/0210082 | A1 | | 9/2006 | Devadas et al. |
| 2006/0221686 | A1 | | 10/2006 | Devadas et al. |
| 2006/0271792 | A1 | | 11/2006 | Devadas et al. |
| 2006/0271793 | A1 | | 11/2006 | Devadas et al. |

(Continued)

FOREIGN PATENT DOCUMENTS

WO WO 2011048126 A1 * 4/2011

OTHER PUBLICATIONS

Eisenbarth et al., "Reconfigurable Trusted Computing in Hardware", 2007.*

(Continued)

*Primary Examiner* — Ondrej Vostal
(74) *Attorney, Agent, or Firm* — Cory G. Claassen

(57) ABSTRACT

Deterrence of device subversion by substitution may be achieved by including a cryptographic fingerprint unit within a computing device for authenticating a hardware platform of the computing device. The cryptographic fingerprint unit includes a physically unclonable function ("PUF") circuit disposed in or on the hardware platform. The PUF circuit is used to generate a PUF value. A key generator is coupled to generate a private key and a public key based on the PUF value while a decryptor is coupled to receive an authentication challenge posed to the computing device and encrypted with the public key and coupled to output a response to the authentication challenge decrypted with the private key.

29 Claims, 9 Drawing Sheets

(56) References Cited

U.S. PATENT DOCUMENTS

| | | | |
|---|---|---|---|
| 2007/0038871 | A1 | 2/2007 | Kahlman et al. |
| 2007/0044139 | A1 | 2/2007 | Tuyls et al. |
| 2007/0183194 | A1* | 8/2007 | Devadas et al. .......... 365/185.03 |
| 2008/0044027 | A1* | 2/2008 | Van Dijk ........................ 380/278 |
| 2008/0059809 | A1 | 3/2008 | Van Dijk |
| 2008/0077792 | A1* | 3/2008 | Mann ............................. 713/160 |
| 2008/0112530 | A1* | 5/2008 | Jensen et al. ................... 376/282 |
| 2008/0141364 | A1* | 6/2008 | Skoric et al. ..................... 726/20 |
| 2008/0231418 | A1* | 9/2008 | Ophey et al. .................. 340/5.85 |
| 2009/0013178 | A9* | 1/2009 | Silverbrook .................... 713/161 |
| 2009/0083833 | A1* | 3/2009 | Ziola et al. ......................... 726/2 |
| 2009/0157994 | A1* | 6/2009 | Hampel et al. ................. 711/168 |
| 2009/0222672 | A1* | 9/2009 | Clarke et al. ................... 713/189 |
| 2009/0254981 | A1 | 10/2009 | Devadas et al. |
| 2010/0031065 | A1* | 2/2010 | Futa et al. ...................... 713/194 |
| 2010/0078636 | A1* | 4/2010 | Zachariasse .................... 257/48 |
| 2010/0085075 | A1* | 4/2010 | Luzzi et al. ........................ 326/8 |
| 2010/0118795 | A1* | 5/2010 | Hassan .......................... 370/329 |
| 2010/0127822 | A1* | 5/2010 | Devadas ........................... 340/5.8 |
| 2010/0146261 | A1* | 6/2010 | Talstra et al. .................. 713/155 |
| 2010/0177898 | A1* | 7/2010 | Tuyls et al. .................... 380/270 |
| 2010/0283585 | A1* | 11/2010 | Anderson et al. ........... 340/10.42 |
| 2010/0293612 | A1* | 11/2010 | Potkonjak ........................ 726/20 |
| 2010/0306550 | A1* | 12/2010 | Kevenaar et al. ............. 713/186 |
| 2011/0002461 | A1* | 1/2011 | Erhart et al. ..................... 380/44 |
| 2011/0050279 | A1* | 3/2011 | Koushanfar et al. ............... 326/8 |
| 2011/0055649 | A1* | 3/2011 | Koushanfar et al. ........... 714/729 |
| 2011/0055821 | A1* | 3/2011 | Tanaka et al. ................. 717/170 |
| 2011/0148457 | A1* | 6/2011 | Abramovici ....................... 326/8 |
| 2011/0215829 | A1* | 9/2011 | Guajardo Merchan et al. .. 326/8 |
| 2011/0239002 | A1* | 9/2011 | Beckmann et al. ............ 713/189 |
| 2011/0317829 | A1* | 12/2011 | Ficke et al. ...................... 380/46 |
| 2012/0002803 | A1* | 1/2012 | Adi et al. ......................... 380/28 |
| 2012/0204023 | A1* | 8/2012 | Kuipers et al. ................. 713/150 |
| 2013/0051552 | A1* | 2/2013 | Handschuh et al. ............. 380/44 |

OTHER PUBLICATIONS

Armknecht et al., "Memory Leakage-Resilient Encryption Based on Physically Unclonable Functions", 2010.*

Blomstrom, "Protection of digital designs from illegal copying", 2009.*

Guneysu et al., "Dynamic Intellectual Property Protection for Reconfigurable Devices", 2007.*

Hammouri et al., "Novel PUF-Based Error Detection Methods in Finite State Machines", 2009.*

Roy et al., "Protecting Bus-based Hardware IP by Secret Sharing", 2008.*

Guajardo et al., "Intrinsic Physical Unclonable Functions in Field Programmable Gate Arrays", 2007.*

Beckmann et al., "Hardware-Based Public-Key Cryptography with Public Physcially Unclonable Functions", 2009.*

Guajardo et al., "Anti-counterfeiting, key distribution, and key storage in an ambient world via physical unclonable functions", 2008.*

Maes et al., "Intrinsic PUFs from Flip-flops on Reconfigurable Devices", 2008.*

Holcomb et al., "Power-Up SRAM State as an Identifying Fingerprint and Source of True Random Numbers", 2008.*

Su, Ying et al., "A Digital 1.6 pJ/bit Chip Identification Circuit Using Process Variations", IEEE Journal of Solid-State Circuits, Jan. 2008, pp. 69-77, vol. 43, No. 1.

Lee, Jae W. et al., "A Technique to Build a Secret Key in Integrated Circuits for Identification and Authentication Applications, Computation Structures Group Memo 472", 2004, 6 pages, Massachusetts Institute of Technology, Computer Science and Artificial Intelligence Laboratory.

Kaps, Jens-Peter et al., "Energy Scalable Universal Hashing", IEEE Transactions on Computers, Dec. 2005, pp. 1484-1495, vol. 54, No. 12.

Kumar, Sandeep S. et al., "Extended Abstract: The Butterfly PUF Protecting IP on every FPGA", Proceedings of the 2008 IEEE International Workshop on Hardware-Oriented Security and Trust, 2008, 4 pages.

Guarjardo, Jorge et al., "FPGA Intrinsic PUFs and Their Use for IP Protection", Proceedings of the 9th international workshop on Cryptographic Hardware and Embedded Systems, Necture Notes In Computer Science; vol. 4727, 2007, pp. 63-80.

Dodis, Yevgeniy et al., "Fuzzy Extractors: How to Generate Strong Keys from Biometrics and Other Noisy Data", SIAM Journal of Computing, 2008, 18 pages, vol. 38, Issue 1.

Mase, Roel et al., "Intrinsic PUFs from Flip-flops on Reconfigurable Devices", $3^{rd}$ Benelux Workshop on Information and System Security, Nov. 2008, 17 pages.

Krawczyk, Hugo, "LFSR-based Hasing and Authentication", Advances in Cryptology—CRYPTO '94, LNCS 839, 1994, pp. 129-139.

Suh, Edward G. et al., "Physical Unclonable Functions for Device Authentication and Secret Key Generation", Proceedings of the 44th annual Design Automation Conference, 2007, pp. 9-14.

Guajardo, Jorge et al., "Physical Unclonable Functions and Public-Key Crypto For FPGA IP Protection", 2007, 7 pages, Philips Research Laboratories, Eindhoven, The Netherlands.

Gassend, Blaise et al., "Silicon Physical Random Features, Computation Structures Group Memo 456", In the proceedings of the Computer and Communication Security Conference, Nov. 2002, 15 pages. Massachusetts Institute of Technology, Computer Science and Artifical Intelligence Laboratory.

* cited by examiner

DETERRENCE OF DEVICE COUNTERFEITING, CLONING, AND SUBVERSION BY SUBSTITUTION USING HARDWARE FINGERPRINTING

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to trusted computing, and in particular but not exclusively, relates to hardware authentication to protect against subversion by substitution.

BACKGROUND INFORMATION

Trustworthy computing (with software) cannot exist without trustworthy hardware to build it on. Even if an integrated circuit is produced using rigorous procedures in a "Trusted Foundry" and certified as "trustworthy," technology must be developed to ensure against wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to deter adversaries from attempting subversion by insertion of subversive functionality and also by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security.

Trusted foundry processing of silicon-based microelectronics requires enormous investments to protect against subversion; however, this investment imparts trust only during the fabrication phase of a component's life cycle. Without the equivalent of rigorous two-person control of the component during the deployment phase of its life cycle, it can be difficult to demonstrate authenticity even for components from today's trusted foundries.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
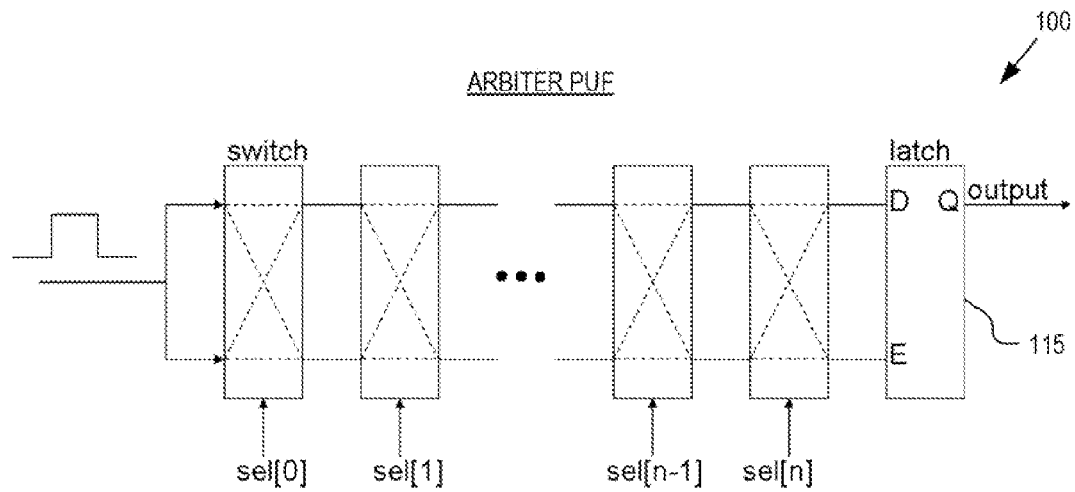
FIG. 1A is a logic circuit diagram of an arbiter type physically unclonable function ("PUF").

Embodiments of a system and method for authenticating hardware devices to deter device counterfeiting, cloning, and subversion by substitution are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention augment the trustworthiness of deployed information processing systems by introducing the concept of a unique "device fingerprint" and a cryptographic challenge/response protocol for authenticating the device fingerprint to protect against subversion by substitution. Disclosed embodiments leverage Physical Unclonable Function (PUF) technology for creation of the device fingerprint. PUFs are derived from random physical characteristics within the hardware of a device, which makes a PUF output difficult to predict from one device to another.

The random PUF output can subsequently be used to generate the device fingerprint which can be authenticated at any time during deployment phase of a component life cycle using a cryptographic challenge/response protocol.

PUFs are functions that are derived from the inherently random, physical characteristics of the material or device in which they are built. For example, a silicon PUF may exploit variations in the delay through interconnects and gates or slight differences in threshold voltage. Since the PUF exploits physical variations of the device or material in which it is built, each PUF should provide a unique (although perhaps noisy) response. This property should hold even amongst "identical" devices fabricated with the same process. Moreover, it should be difficult to purposefully produce a PUF with the same output as a given PUF. The quality of a PUF can be measured by interdevice variation and intradevice variation. Ideally, the interdevice variation of a PUF should be near 50% so different devices produce very different output, while the intradevice variation should be near 0% so that a given device consistently provides the same response. In practice, interdevice and intradevice variations will be less than the ideal goals. Additionally, a good PUF should be resistant to changes in temperature and supply voltage.

PUFs can be broadly categorized as delay based and memory based. Delay based PUFs, such as a ring oscillator PUF and an arbiter, measure the difference in delay through "identical" circuits. Memory based PUFs exploit variations in memory structures, such as cross-coupled logic gates and latches and SRAM cells.

Figure 1B:
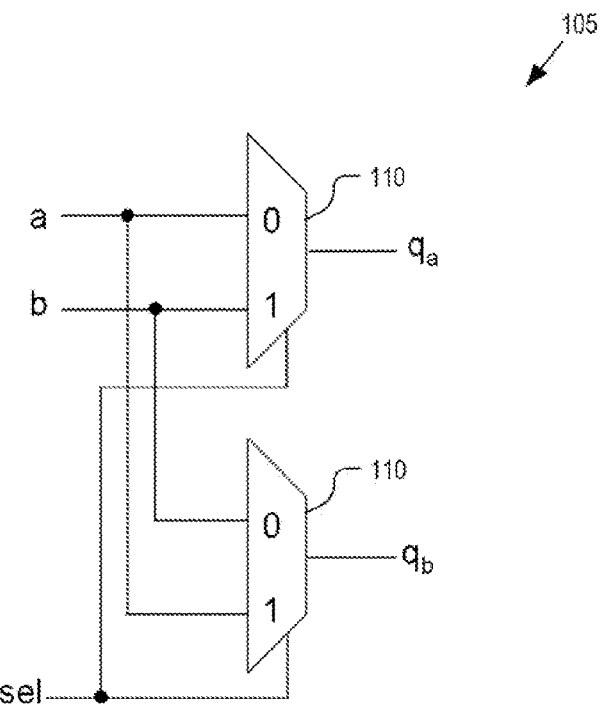
FIG. 1B is a logic circuit diagram of a switch element within an arbiter type PUF.

FIG. 1A is a logic circuit diagram of an arbiter PUF 100. Each stage of arbiter PUF 100 is a switch circuit 105, illustrated in FIG. 1B. FIG. 1B illustrates that switch circuit 105 includes a pair of two input multiplexers 110 with a shared select signal (SEL). When SEL is '1' the upper input a is routed to the lower output, $q_b$, and the lower input b is routed to the upper output, $q_a$. When SEL is '0' the inputs are not crossed over, and the a and b inputs pass straight through the module. Arbiter PUF 100 chains n switch circuits 105 together. At the first stage a pulse is presented to the a and b inputs at the same time. The signal then races along the two paths through the circuit, switching between the lower and upper paths as determined by the SEL input at each stage. After the last stage of arbiter PUF 100, an arbiter (e.g., latch 115) determines the output of the circuit; if the D input arrives first the output is '0' and if the E input arrives first the output is '1'.

Arbiter PUF 100 accepts an n-bit input SEL and produces as output a single bit. This generates a challenge-response pair wherein the challenge is the input, or sequence of inputs, and the response is the output or sequence of outputs. As such, this PUF has an intrinsic challenge-response capability. The PUF output is the response to a particular challenge. To achieve a k-bit response, one may provide k different inputs to a single arbiter PUF 100, evaluate k instantiations of arbiter PUF 100, or some combination thereof.

Figure 2:
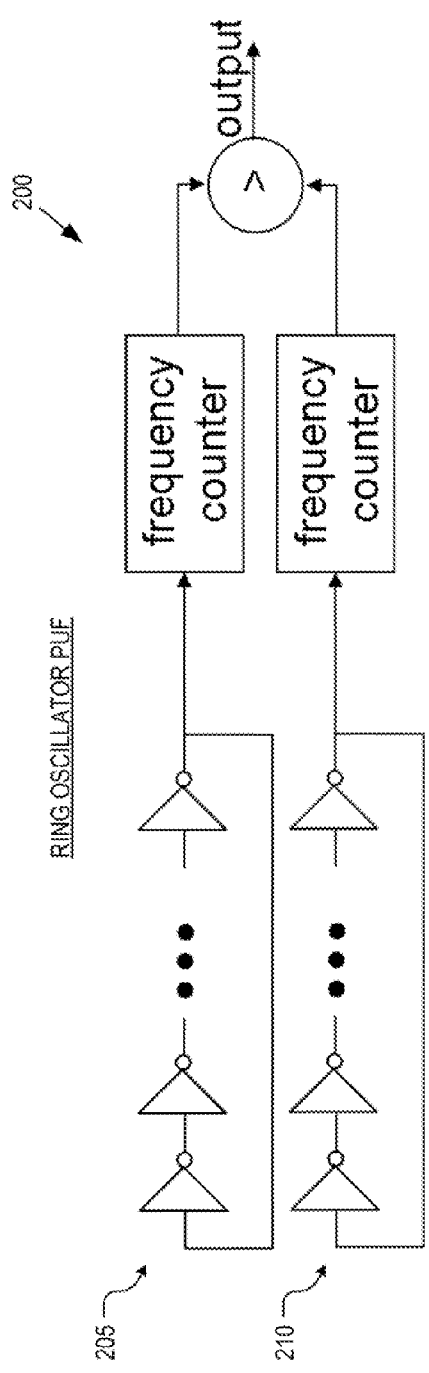
FIG. 2 is a logic circuit diagram of a ring oscillator type PUF.

FIG. 2 is a logic circuit diagram of a ring oscillator PUF 200. Ring oscillator PUF 200 exploits variations in the resonance frequencies of a set of identical ring oscillators 205 and 210. To produce an output bit the resonance frequencies of ring oscillators 205 and 210 are compared and the output bit is determined by which oscillator is fastest. A k bit sequence is produced by making k comparisons between multiple different ring oscillators; however, one should be careful to choose independent, uncorrelated comparisons. If the resonance frequency for oscillator i is $f_{osci}$, then if we have $f_{osc1} > f_{osc2}$ and $f_{osc2} > f_{osc3}$, then $f_{osc1} > f_{osc3}$, and the bit generated by comparing $f_{osc1}$ to $f_{osc3}$ is correlated to the bits produced by the other comparisons. When compared to arbiter PUF 100, disadvantages of ring oscillator PUF 200 include area, speed, and power dissipation. However, ring oscillator PUF 200 is likely easier to implement since it does not require routing two long, almost identical paths across an ASIC or FPGA, as is the case with arbiter PUF 100.

Figure 3:
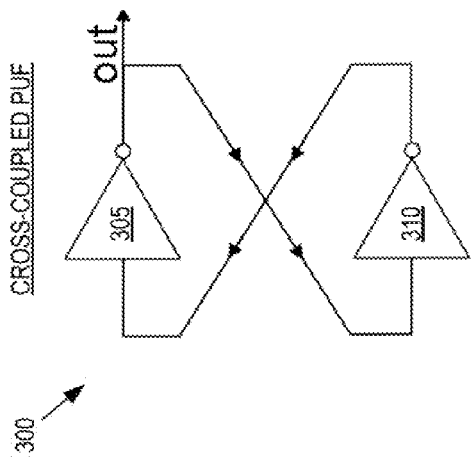
FIG. 3 is a logic circuit diagram of a cross-coupled type PUF.

FIG. 3 is a logic circuit diagram of a cross-coupled PUF 300. Cross-coupled PUF 300 uses a positive feedback loop to store a bit. Without applying any external stimulus, the output of cross-coupled PUF 300 will attain a stable output. The value of this output results from differences in interconnect delay and the voltage transfer characteristics of the inverters 305 and 310. A k bit sequence can be obtained from k cross-coupled inverter pairs. Other logic gates, such as NAND and NOR gates, can also be connected in a cross-coupled configuration to be used as a PUF.

Figure 4:
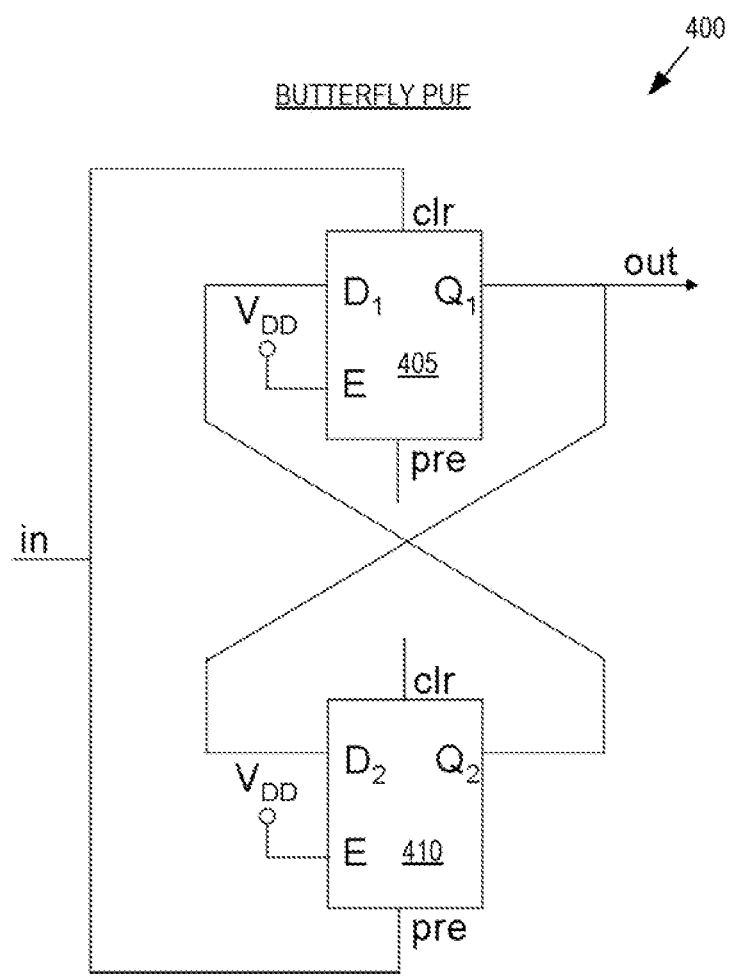
FIG. 4 is a logic circuit diagram of a butterfly type PUF.

FIG. 4 is a logic circuit diagram of a butterfly PUF 400. The illustrated embodiment of butterfly PUF 400 includes cross-coupled D latches 405 and 410. The enable inputs (E) to the latches are tied high so that the D input is always transferred to the Q output. To operate the circuit as a PUF, "in" is set to '1', which causes the active high "clr" and "pre" signals to set Q1='0', Q2='1'. Since the latches are cross-coupled, this forces D1='1' and D2='0'. These inputs are ignored while "in" is asserted. Next, "in" is set to '0', which causes the system to enter an unstable state. At this point the positive feedback loop and differences in wire and latch propagation delays force the output to a stable value. As with cross-coupled PUF 300, k bits are generated by implementing k butterfly PUFs within a given device.

Other PUF circuits, in addition to those illustrated in FIGS. 1-4, may be implemented in connection with embodiments of the invention as well. In fact, a variety of PUFs may be suitable, as long as, a given PUF design has sufficiently small intra-device variation and sufficiently large inter-device variation given a desired level of security. For example, intrinsic PUFs, which are created from a resource that already exists on a chip may be used. In the case of FPGAs, the startup values of SRAM and flip-flops may be leveraged. The primary advantage of intrinsic PUFs is that they are already present on the FPGA, and so only a readout circuit is needed to obtain the value of the PUF. In this sense, fewer FPGA resources are required to implement the function. However, in some cases it may be difficult to read the value of an intrinsic PUF, since SRAM and flip-flop states on FPGAs are commonly forced into a known state upon power up. As such, modification of the bit stream loaded into the FPGA may be necessary for readout.

The arbiter PUF is a fairly simple design, with each stage including only two multiplexers. However, one may require many such stages to achieve a sufficient difference in path delay for the circuit to function as a PUF. Moreover, it may be necessary to hand-route the arbiter PUF to ensure that the two paths are nearly identical. Otherwise, one path could be deterministically shorter than the other. If the paths are long, or if there are many arbiter PUFs within a device, considerable routing resources could be consumed. Additionally, an n-stage arbiter PUF requires n input bits to produce a single output bit. This is a low-power design.

The ring oscillator PUF likely consumes approximately as many logic resources as the arbiter PUF. Each stage of the ring oscillator PUF uses one inverter, while each stage of the arbiter PUF uses two multiplexers. However, the ring oscillator PUF also requires frequency counters, which may be large. Additionally, a ring oscillator circuit dissipates substantially more power than the arbiter circuit, although operation of ring oscillator PUFs in the subthreshold regime to improve interdevice variation and decrease power may be possible. The ring oscillators should be operated for some period of time for a valid comparison of their frequencies to be made. For this reason, the ring oscillator PUF is also a slow PUF. If the ring oscillators to be compared are hard coded into a design, then no input other than an enable signal to turn the ring oscillators on and off and to reset the counters, is necessary. If the comparisons are not hard-wired then select inputs to multiplexers that choose the comparisons may be needed. To build the ring oscillator PUF, a single ring oscillator could be manually laid out, and then instantiate this layout in several locations.

The cross-coupled PUF uses just two inverters to obtain one bit of output, and does not require any input. After the PUF obtains a steady state it consumes little or no power. As such, this is a small, fast PUF that dissipates little power. Again, a single cross-coupled PUF could be manually laid out and then instantiated several times.

The butterfly PUF is similar to the cross-coupled PUF, but uses latches rather than inverters and requires an input signal. After the circuit achieves steady-state little or no power is dissipated, but the design consumes more power than the cross-coupled PUF. This design will also be slower than the cross-coupled PUF, since it must be driven into an unstable state and then allowed to relax to a steady state. The layout area is larger than the cross-coupled PUF, due to the use of latches rather than inverters and the routing required for an input signal. The design and layout may proceed similarly to that of the ring oscillator and cross-coupled PUFs.

Figure 5:
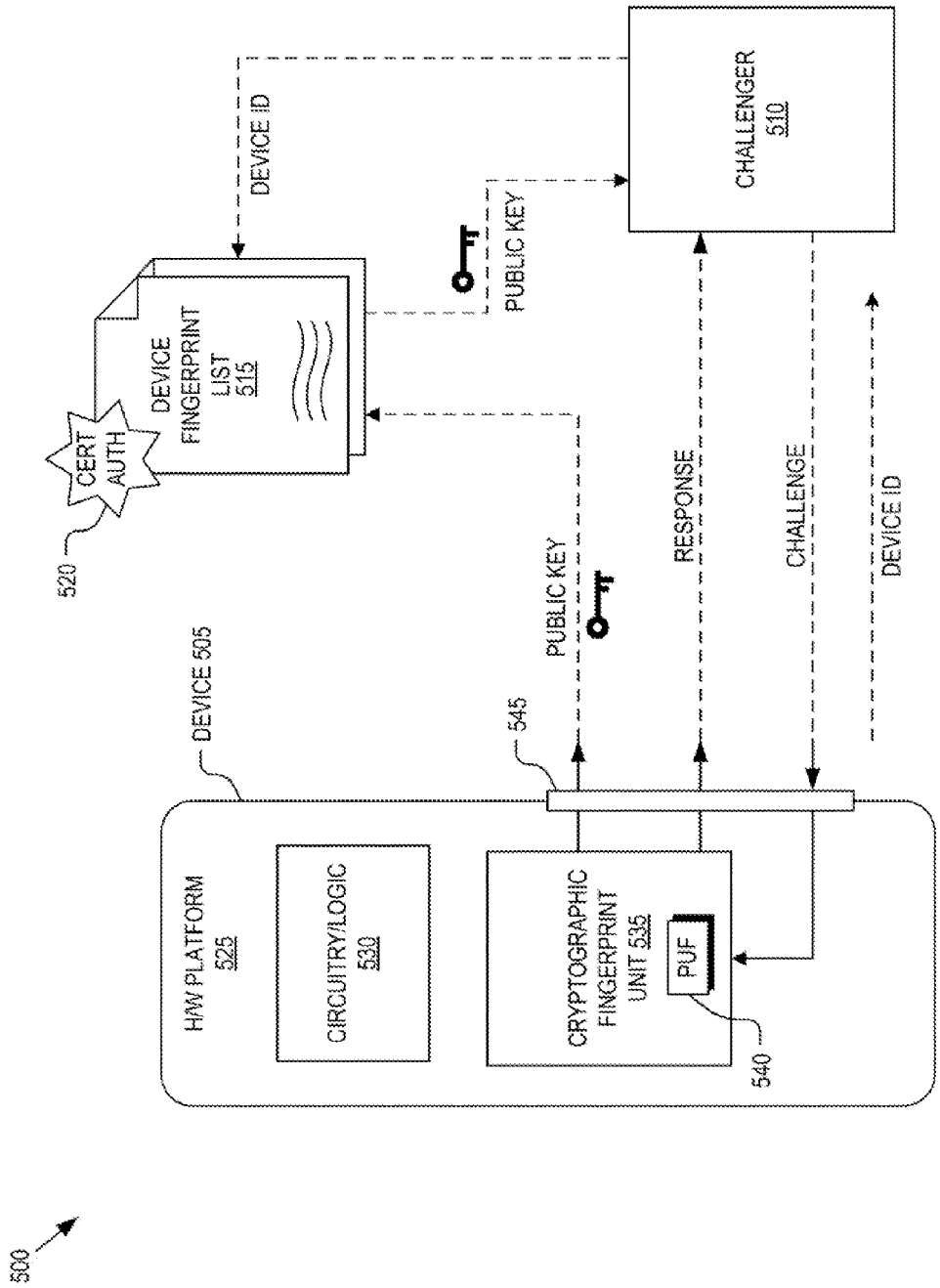
FIG. 5 is a functional block diagram illustrating a device fingerprinting infrastructure for authenticating hardware devices and deterring device subversion by substitution, in accordance with an embodiment of the invention.

FIG. 5 is a functional block diagram illustrating a device fingerprinting infrastructure 500 for authenticating hardware devices and deterring device subversion by substitution, in accordance with an embodiment of the invention. The illustrated embodiment of infrastructure 500 includes a device 505 to be authenticated, a challenger 510 interested in authenticating device 505 and a device fingerprint list 515 maintained or certified by a certifying authority 520. The illustrated embodiment of device 505 includes a hardware platform 525, primary circuitry (or function logic) 530 of the device, a cryptographic fingerprint unit 535 including a PUF circuit 540, and a input/output ("I/O") ports 545. Cryptographic fingerprint unit 535 may be implemented entirely within hardware or partially using hardware and partially using software/firmware. In either embodiment, the PUF circuit 540, which may be implemented using any PUF circuit having suitably small intra-device variation and sufficiently large inter-device variation, including but not limited to PUF circuits 100, 200, 300, 400, along with primary circuitry 530 are both integrated into hardware platform 525. For example, if device 505 is a semiconductor based integrated circuit ("IC"), then PUF circuit 540 may be integrated into the semiconductor die including circuitry 530. Of course, other components of cryptographic fingerprint unit 535 (described below in connection with FIG. 8) may also be integrated into hardware platform 525 of device 505.

Device 505 may represent any device of which hardware authentication during the deployment phase of its lifecycle is desired. For example, device 505 may represent a CPU, a microcontroller, video card, or virtually any hardware device, which may or may include software/firmware code. Hardware platform 525 may include a semiconductor die of an application specific IC ("ASIC") or general purpose IC (e.g., CPU), a field programmable gate array ("FPGA"), a printed circuit board ("PCB"), or otherwise. It should be appreciated that hardware platform 525 may include memory units for storing executable code (e.g., software or firmware) for operating primary circuitry 530 and/or portions of cryptographic fingerprint unit 535.

External communication with cryptographic fingerprint unit 535 is conducted through I/O ports 545. In one embodiment, I/O ports 545 may include existing industry standard test ports, such as a Joint Test Action Group ("JTAG") test access port ("TAP"). Of course, external communications may be multiplexed over standard data ports or other types of test ports.

Figure 6:
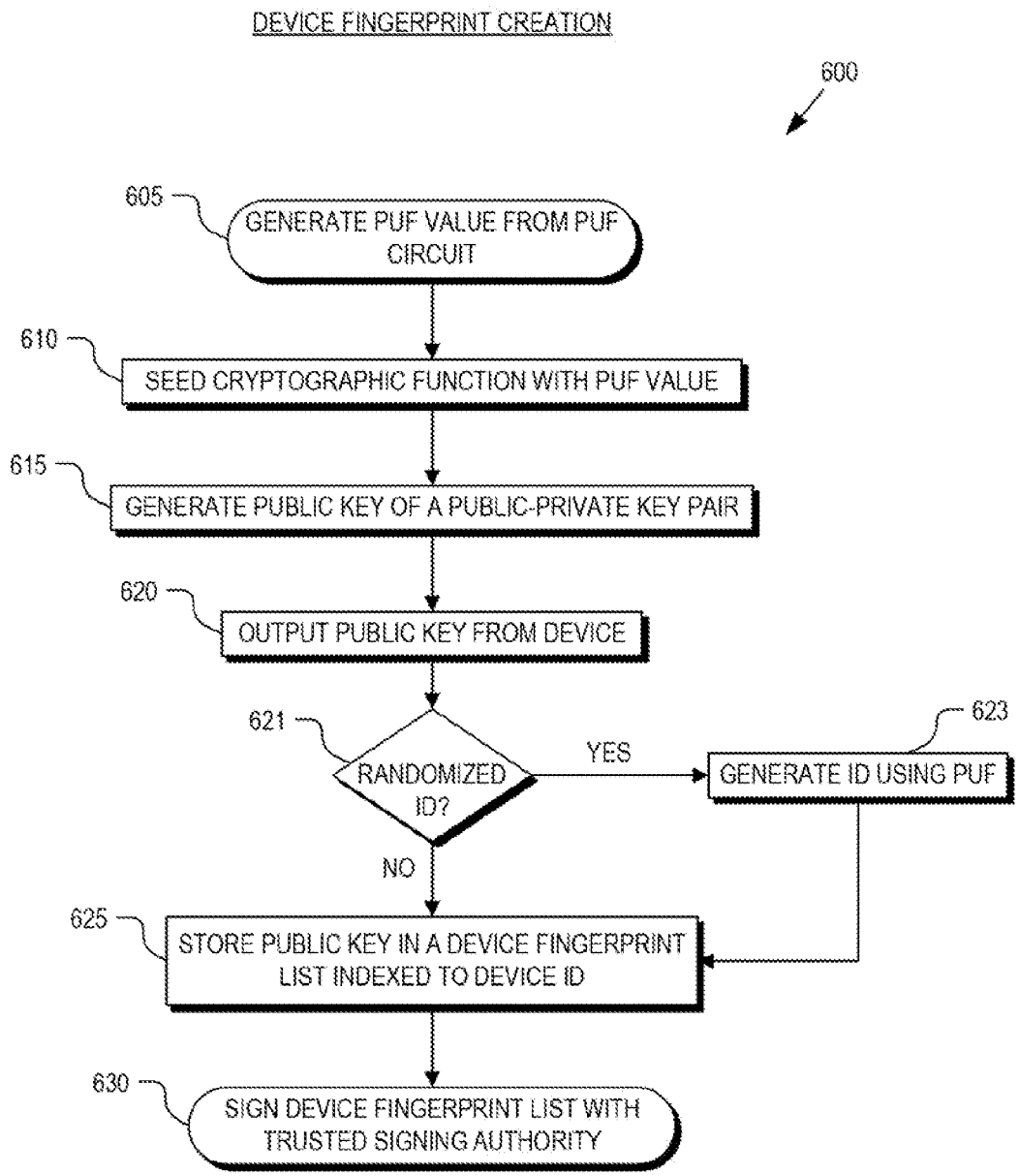
FIG. 6 is a flow chart illustrating a process for uniquely fingerprinting a hardware device, in accordance with an embodiment of the invention.

Operation of infrastructure 500 is described in connection with processes 600 and 700 illustrated in the flow charts of FIGS. 6 and 7, respectively. FIG. 6 is a flow chart illustrating process 600 for the creation of a unique cryptographic hardware fingerprint for device 505, in accordance with an embodiment of the invention. The order in which some or all of the process blocks appear in process 600 should not be deemed limiting. Rather, one of ordinary skill in the art having the benefit of the present disclosure will understand that some of the process blocks may be executed in a variety of orders not illustrated.

In a process block 605, PUF circuit 540 generates a unique PUF value that is measured by cryptographic fingerprint unit 535. The PUF value remains internal to device 505 and is not transmitted externally. In one embodiment, the PUF value is generated in real-time each time it is need and is not stored for future use internally. The PUF value is a n-bit value (e.g., n=2474 bits) that may be generated via a corresponding plurality of individual PUF circuits for each bit, generated in response to 'n' input test vectors that reconfigure a single PUF circuit to generate the n-bit value, or some combination of both.

In a process block 610, the PUF value is used as a seed value to a cryptographic function. For example, the cryptographic function may be the creation of a public-private key pair where the PUF value is the seed value for the key generator. In one embodiment, the public-private key pair is generated according to the RSA cryptographic algorithm using a seed value generated from the measured PUF value.

In a process block 620, the public key from the public-private key pair is output from device 525 via I/O ports 545. If a standard unique identifier ("ID") is to be used (decision block 621), then process 600 continues to a process block 625. In process block 625, the public key is stored into a device fingerprint list 515 and indexed to ID referencing device 525. In this context, the combination of the public key and ID operate as a sort of cryptographic hardware fingerprint that is uniquely associated with the particular hardware instance of device 505. In one embodiment, the ID is a manufacturing serial number, a globally unique identifier ("GUID"), or other unique identifier associated with hardware platform 525 of device 505. Device fingerprint list 515 may be populated by a manufacturer of device 505 prior to device 505 being shipped to customers as a means of tracking and authenticating part numbers. Device fingerprint list 515 may subsequently be accessed by a customer, an OEM manufacturer incorporating device 505 into a larger system, an end-user, or a third party interacting with device 505 (either directly or remotely over a network) wishing to authenticate device 505 (discussed in connection with FIG. 7). As an added security measure, device fingerprint list 515 may be signed and maintained by a trusted third party, such as a certification authority 520 of a public key infrastructure (process block 630).

Returning to decision block 612, if the ID is to be randomized for added security, then process 600 continues to a process block 623. In process block 623, cryptographic fingerprint unit 535 generates the ID as a randomized value. In one embodiment, the ID can be generated based on a portion of the PUF value output from PUF 540. In yet another embodiment, a second ID PUF may be included within cryptographic fingerprint unit 535 for the purpose of generating a randomized ID. When generating a randomized PUF based ID, an enrollment procedure may be executed to handle rare situations of collisions between PUF based IDs of two different devices 505. In the event of an ID collision, the ID PUF can be "reprogrammed" using PUF perturbation devices 825 (discussed below in connection with FIG. 8) thus causing the ID PUF to generate a new, hopefully unique, ID value. The PUF perturbation devices 825 can be reprogrammed multiple times during the enrollment procedure until a unique ID is obtained (statistically it is highly unlikely that the perturbation devices 825 would have to be adjusted multiple times to achieve a unique output PUF value).

The above combination of elements and procedures forms a method of tracing the origin of the hardware component, thus forming a deterrent against insertion of a subversion or substitution of a subverted component by an adversary who wishes to avoid attribution upon subsequent discovery of the subversion. In particular, this forms a deterrent to subversions introduced during the manufacturing process, since any such subversions could be attributed to the manufacturer. It does not provide attribution of subversions introduced during the deployed life of the device, but does permit detection of tampering, which is in itself a deterrent.

Figure 7:
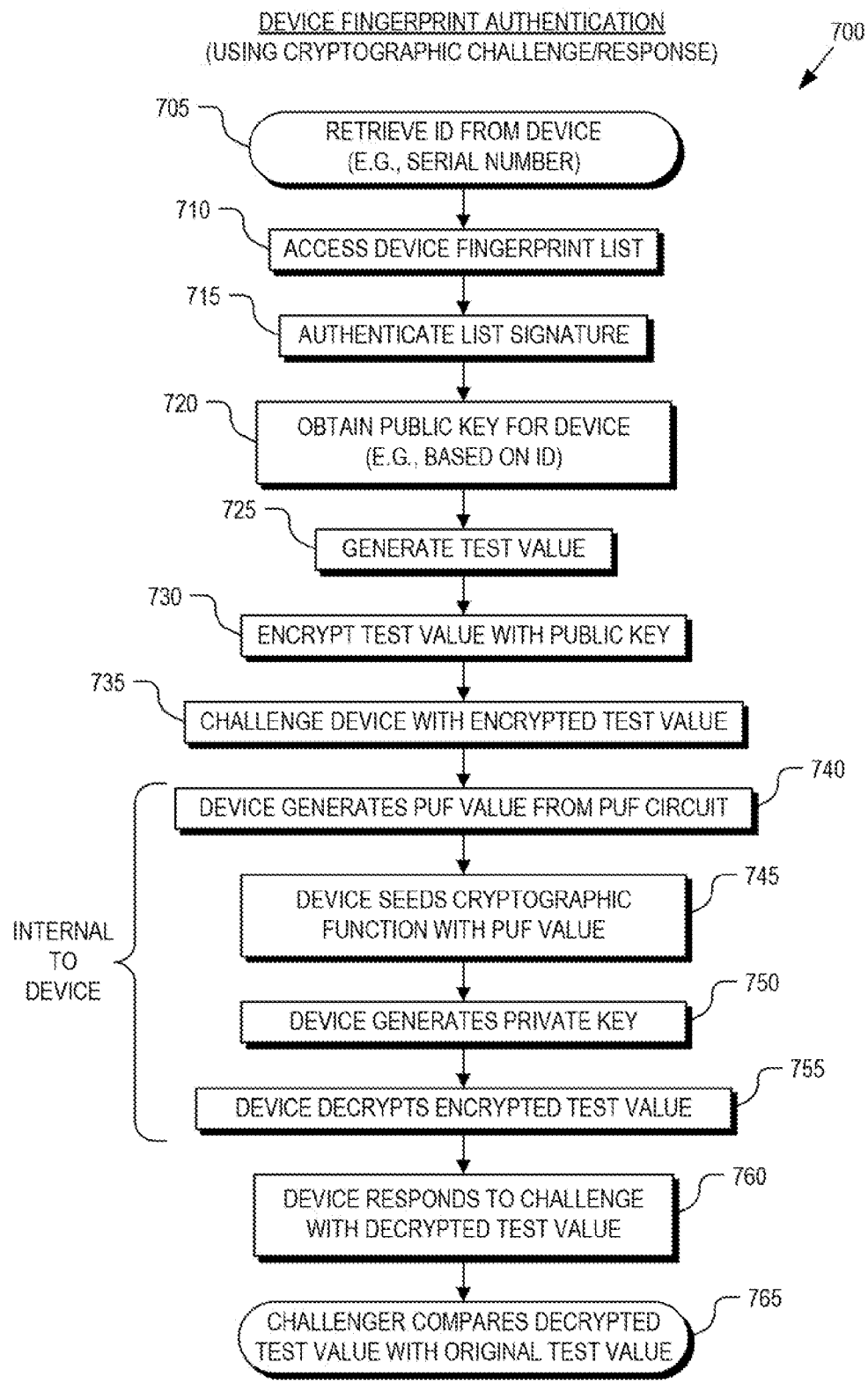
FIG. 7 is a flow chart illustrating a process for authenticating a hardware device using a cryptographic challenge/response and device fingerprint, in accordance with an embodiment of the invention.

FIG. 7 is a flow chart illustrating a process 700 for authenticating device 505 during the deployment phase of its lifecycle using a cryptographic challenge/response and a device fingerprint, in accordance with an embodiment of the invention. The order in which some or all of the process blocks appear in process 700 should not be deemed limiting. Rather, one of ordinary skill in the art having the benefit of the present disclosure will understand that some of the process blocks may be executed in a variety of orders not illustrated.

In a process block 705, challenger 510 retrieves the device ID associated with device 505. In one embodiment, the ID is retrieved from device 505 either manually or via an electronic query. For example, the ID may be a serial number physically displayed on the part (e.g., sticker, engraving, printed, etc.) or it may be electronically stored within device 505 (e.g., within non-volatile memory).

In a process block 710, challenger 510 uses the ID to access the associated public key from device fingerprint list 515. In one embodiment, the ID is used to retrieve a signed certificate from certification authority 520, which includes the public key. Upon accessing device fingerprint list 515, the list itself may also be authenticated with reference to its certification signature to ensure the list has not been compromised (process block 715). If the signature is validly authenticated, then challenger 510 can retrieve the public key with assurances that it has not be tampered with (process block 720).

In a process block 725, challenger 510 generates a test value or test message for submission to cryptographic fingerprint unit 535 as a sort of secret phrase challenge. The test value can be a numeric value, an alphanumeric phrase, or otherwise. One embodiment uses a random nonce for the test value that is especially hard for anyone other than the challenger to predict. In a process block 730, challenger 510 encrypts the test value using the private key obtained in process block 720. In a process block 735, the encrypted test value is submitted to cryptographic fingerprint unit 535 as a sort of cryptographic challenge.

If device 505 is the original, non-substituted device, then its PUF circuit 540 will be able to regenerate the PUF value used to seed the key generator that created the original public-private key pair. Thus, the authentic device 505 is the only device that will be able to regenerate the original private key to decrypt the encrypted test value and respond to the challenged with the decrypted test value.

Accordingly, in a process block 740, PUF circuit 540 is enabled to regenerate the PUF value, which is used by the key generator to generate the private key (process block 750). By recreating the private key at the time of being challenged (as opposed to retrieving a stored copy of the private key created at the time of adding the device fingerprint into device fingerprint list 515), the hardware platform 525 of device 505 is contemporaneously being retested at the time of the challenge.

With the newly recreated private key, cryptographic fingerprint unit 535 decrypts the test value (process block 755) and responds to challenger 510 with the decrypted test value (process block 760). Finally, in a process block 765, challenger 510 compares the test value received in the response from device 505 to the original test value it has selected and encrypted. If the two match, challenger 510 can be confident that the hardware platform 525 of device 505 has not be subverted by substituting parts, since the only device in possession of the private key necessary to decrypt the test value would be the original authentic device 505. It is noteworthy, that at no time is private key transmitted external to device 505, and furthermore in some embodiments private key is not stored or retained any longer than required to respond to a given challenge. Each time the device 505 is cryptographically challenged on its authenticity, the private key is regenerated using PUF circuit 540.

Figure 8:
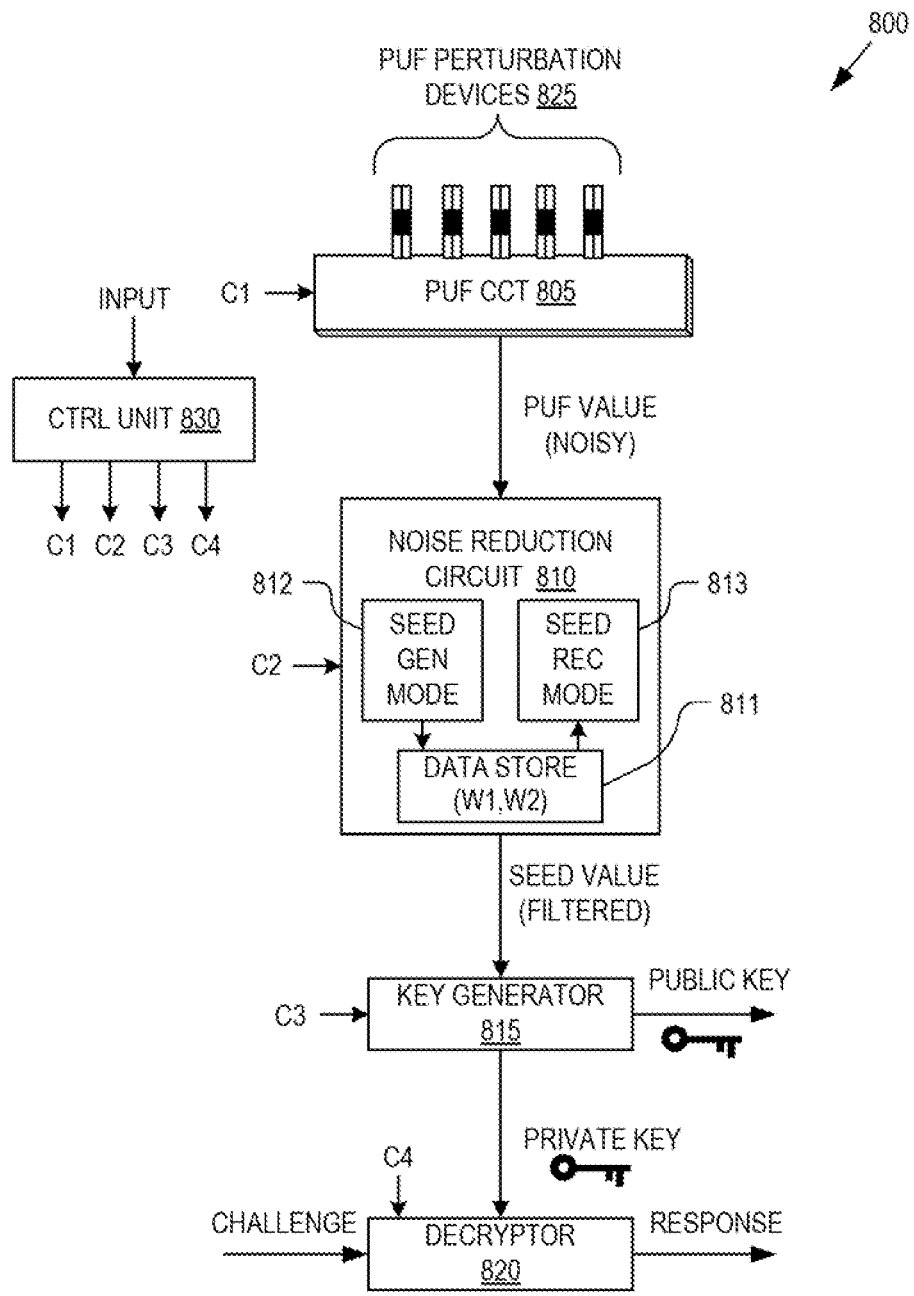
FIG. 8 is a functional block diagram illustrating a cryptographic fingerprint unit, in accordance with an embodiment of the invention.

FIG. 8 is a functional block diagram illustrating a cryptographic fingerprint unit 800, in accordance with an embodiment of the invention. Cryptographic fingerprint unit 800 is one possible implementation of cryptographic fingerprint unit 535 illustrated in FIG. 5. The illustrated embodiment of cryptographic fingerprint unit 800 includes a PUF circuit 805, a noise reduction circuit 810, a key generator 815, a decryptor 820, PUF perturbation devices 825, and a control unit 830. The illustrated embodiment of noise reduction circuit 810 includes a data store 811, a seed generation mode 812, and a seed recovery mode 813.

Control unit 830 may receive inputs and generate outputs to be coupled to the components of fingerprint unit 800 to choreograph their operation. Control unit 830 may be implemented as software/firmware instructions executing on a microcontroller, an ASIC, a state machine, or otherwise. In some embodiments, control unit 830 need not control all of the components of fingerprint unit 800. For example, in an embodiment where PUF circuit 805 is implemented using a cross-coupled type PUF, then control unit 830 may not provide any control signaling to PUF circuit 805 or may simply include an enable signal to enable PUF circuit 805. However, in one embodiment where PUF circuit 805 is implemented using an arbiter type PUF, control unit 830 may receive the SEL bits as the INPUT to configure PUF circuit 805. The SEL bits may be part of the cryptographic challenge posed by challenger 510.

PUF perturbation devices 825 are programmable devices that can be used to increase the variability of PUF circuit 805 by affecting the delay paths within PUF circuit 805. For example, PUF perturbation devices 825 may be programmable by the end user to facilitate user customization and user control over the variability and output of PUF circuit 805. In one embodiment, PUF perturbation devices 825 are programmable anti-fuses that are either coupled to delay paths with PUF circuit 805 or disposed adjacent to a delay path within PUF circuit 805. The parasitic coupling between a coupled (or adjacent) PUF perturbation device 825 has the effect that the programmed state of each of the PUF perturbation devices 825 can randomly change the PUF value output by PUF circuit 805. The user may program PUF perturbation device 825 upon first use to change the PUF value and create a new device fingerprint, or re-fingerprint the device at a later time, if the end user ever becomes concerned that the privacy of the PUF value or the PUF seed has been compromised.

During operation, PUF circuit 805 outputs a PUF value, which may be an inherently noisy value in some designs due to thermal variations, etc. Thus directly using the PUF value to seed key generator 815 may not be advisable in some implementations. Accordingly, in some embodiments a noise reduction circuit 810 is interposed between key generator 815 and PUF circuit 805 to convert the noisy PUF value to a filtered PUF seed that is stable and repeatable. While it is desirable for a given PUF circuit 805 to output different, random values between different physical devices, it is not desirable for a given PUF circuit 805 of a single instance of device 505 to output different values over its lifecycle (unless PUF perturbation devices 825 have been reprogrammed by the end user as part of a deliberate re-fingerprinting of device 505). Thus, noise reduction circuit 810 operates to remove the uncertainty in the noisy PUF value. In one embodiment, noise reduction circuit 810 is implemented as a fuzzy extractor, which uses error code correcting ("ECC") techniques to remove undesirable variability. Operation of a fuzzy extractor implementation of noise reduction circuit 810 is discussed in detail in connection with FIGS. 9 and 10 below.

Key generator 815 is coupled to receive a seed value, which is based on the PUF value measured from PUF circuit 805. Key generator 815 uses the seed value to seed its encryption engine and generate a unique public-private key pair. In one embodiment, the public-private key pair are generated according to the RSA (Rivest, Shamir and Adleman) cryptographic algorithm. During operation, the private key is also kept internal to cryptographic fingerprint unit 535 and never exported externally from device 505. In contrast, during the fingerprinting operation, the public key is exported from device 505 along with a device ID to enroll the device fingerprint with device fingerprint list 515.

Cryptographic fingerprint unit 535 as the sole holder of the private key, is the only entity capable of decrypting a message encrypted using the corresponding public key. Thus, during an authentication event, challenger 510 will present its cryptographic challenge in the form of an encrypted message to device 505. Decryptor 820 receives the challenge and uses the private key to decrypt the message and generate the response.

The illustrated embodiment of noise reduction circuit 810 includes at least two modes of operation: seed generation mode 812 and a seed recovery mode 813. Control unit 830 places noise reduction circuit 810 into the seed generation mode 812 when creating a new cryptographic fingerprint for device 505, while control unit 830 places noise reduction circuit 810 into the seed recovery mode 813 during a cryptographic authentication event.

Figure 9:
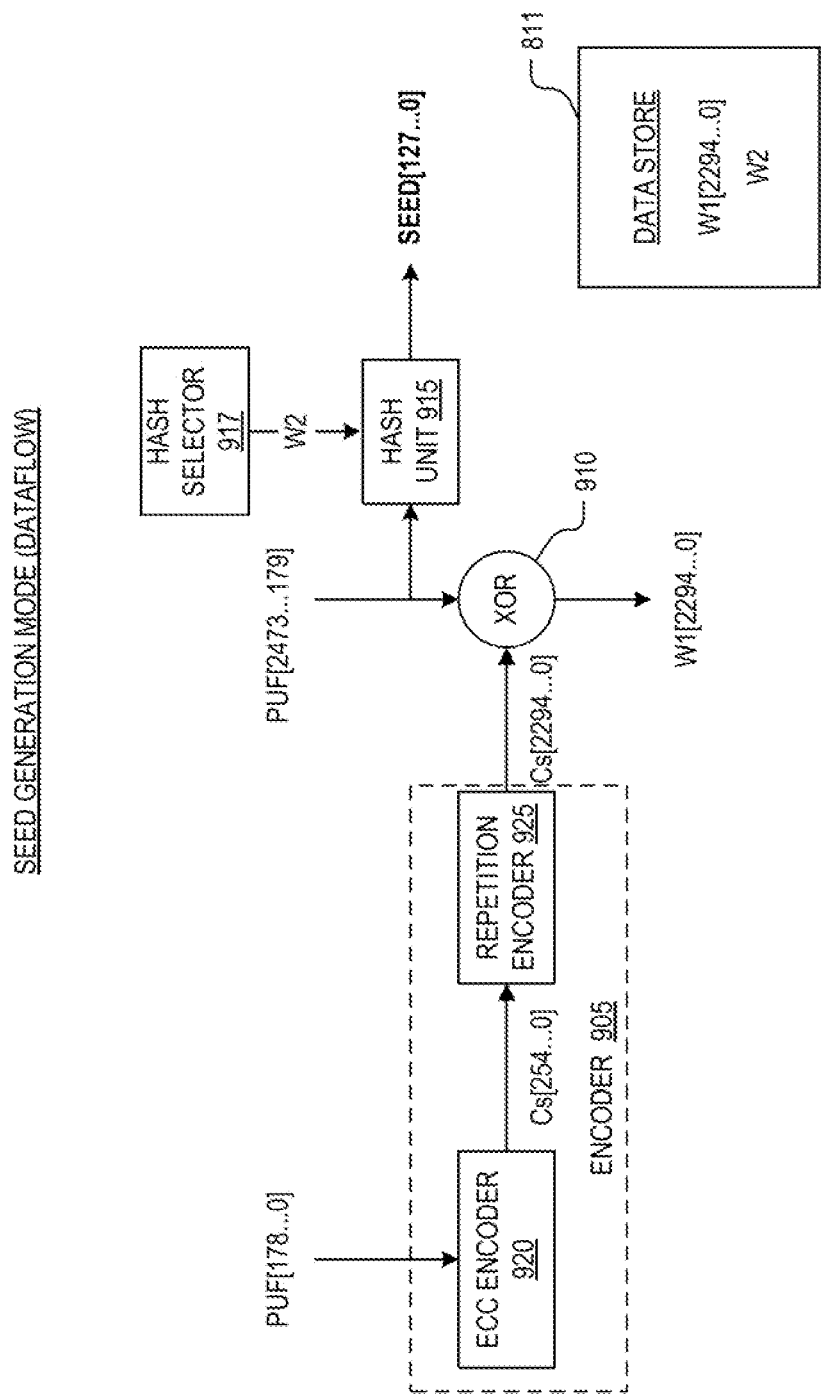
FIG. 9 is a dataflow diagram illustrating a seed generation mode of a noise reduction circuit during creation of a device fingerprint, in accordance with an embodiment of the invention.

FIG. 9 is a dataflow diagram illustrating seed generation mode 812 of noise reduction circuit 810 during creation of a device fingerprint, in accordance with an embodiment of the invention. During seed generation mode 812, noise reduction circuit 810 is configured to include an encoder 905, a logic unit 910, a hash unit 915, a hash selector 917, and data store 811. The illustrated embodiment of encoder 905 includes an ECC encoder 920 and a repetition encoder 925.

Noise reduction circuit 810 may be configured to operate in the seed generation mode 812 by enabling hardware components to implement the dataflow illustrated in FIG. 9, by loading/executing software/firmware modules to implement the dataflow illustrated in FIG. 9, by reconfiguring interconnections between the ECC encoder 920, repetition encoder 925, logic unit 910, and hash unit 915 to form the dataflow illustrated in FIG. 9, some combination thereof, or otherwise. Each component illustrated in FIG. 9 may be implemented entirely in hardware, entirely in software, or a combination of both.

In the illustrated embodiment, noise reduction in the noisy PUF value is achieved via application of error correction techniques to the PUF value so that future bit errors in the PUF value can be identified and corrected to generate a reliably, consistent, and less noisy seed value. A variety of ECC techniques may be applied; however, in one embodiment, ECC encoder 920 is implemented using a BCH encoder to generate an error correcting codeword Cs. To ensure security and prevent an adversary from reverse generating the seed value, the codeword Cs should be selected randomly. Accordingly, in one embodiment, a first portion of the PUF value itself is used to generate the codeword Cs during the seed generation mode 812.

During operation of the seed generation mode 812, PUF circuit 805 is enabled and its output PUF value measured. A first portion of the PUF value PUF[178 . . . 0] is provided to encoder 905 while a second portion of the PUF value PUF [2473 . . . 179] is provided to logic unit 910 and hash unit 915. ECC encoder 920 uses the first portion PUF[178 . . . 0] to generate the codeword Cs[254 . . . 0]. The codeword is expanded using repetition encoder 925 to generate codeword Cs[2294 . . . 0]. Although FIG. 9 illustrates the use of a 255 bit codeword and a 9× repetition encoder, longer or shorter codewords and higher or lower repetition encoders may be used according to the level of noise in the PUF value. Similarly, although FIG. 9 illustrates a 2474-bit PUF value, longer or shorter PUF values may be used according to the desired strength of security. Repetition encoder 925 may be replaced by other types of encoders as well.

Logic unit 910 combines the second portion of the PUF value PUF[2473 . . . 179] with the codeword Cs[2294 . . . 0] to generate helper data W1[2294 . . . 0]. In the illustrated embodiment, logic unit 910 uses an XOR function to combine the two values, though other logic functions may be implemented (e.g., XNOR). The helper data W1[2294 . . . 0] is a value, which is used during the seed recovery mode 813 to regenerate the seed value SEED[127 . . . 0] generated during seed generation mode 812, but the helper data cannot easily be leveraged to surreptitiously reverse engineer the codeword Cs[2294 . . . 0]. Hash unit 915 hashes the second portion PUF[2473 . . . 179] to generate the fixed length seed value SEED[127 . . . 0]. The hash unit 915 performs a function known as "privacy amplification" or "entropy amplification" since the entropy per bit in the PUF[2473 . . . 179] will be less than one. In one embodiment, the width of the PUF value input into hash unit 915 and the width of the seed value output from hash unit 915 is engineered to compensate for average deficiency in entropy rate in the inter-device variability of the PUF measurement.

In one embodiment, for added security the particular hash algorithm is also selected from a large set of hash algorithms, in which case, helper data W2 indicating the particular hash algorithm selected is also stored into data store 811. In one embodiment, hash selector 917 generates W2 to implement a randomized selection of the hash algorithm. In one embodiment, hash selector 917 uses a portion of the PUF value to randomly select a particular hash algorithm from a LFSR hash. In one embodiment, hash selector 917 includes an LFSR hash coupled to receive a portion of the PUF value. The output of the LFSR hash is then coupled into an irreducible polynomial generator, which outputs the W2 value for selecting the hash algorithm. In yet another embodiment, hash selector 917 includes a random number generator couled to an irreducible polynomial generator to generate W2.

Figure 10:
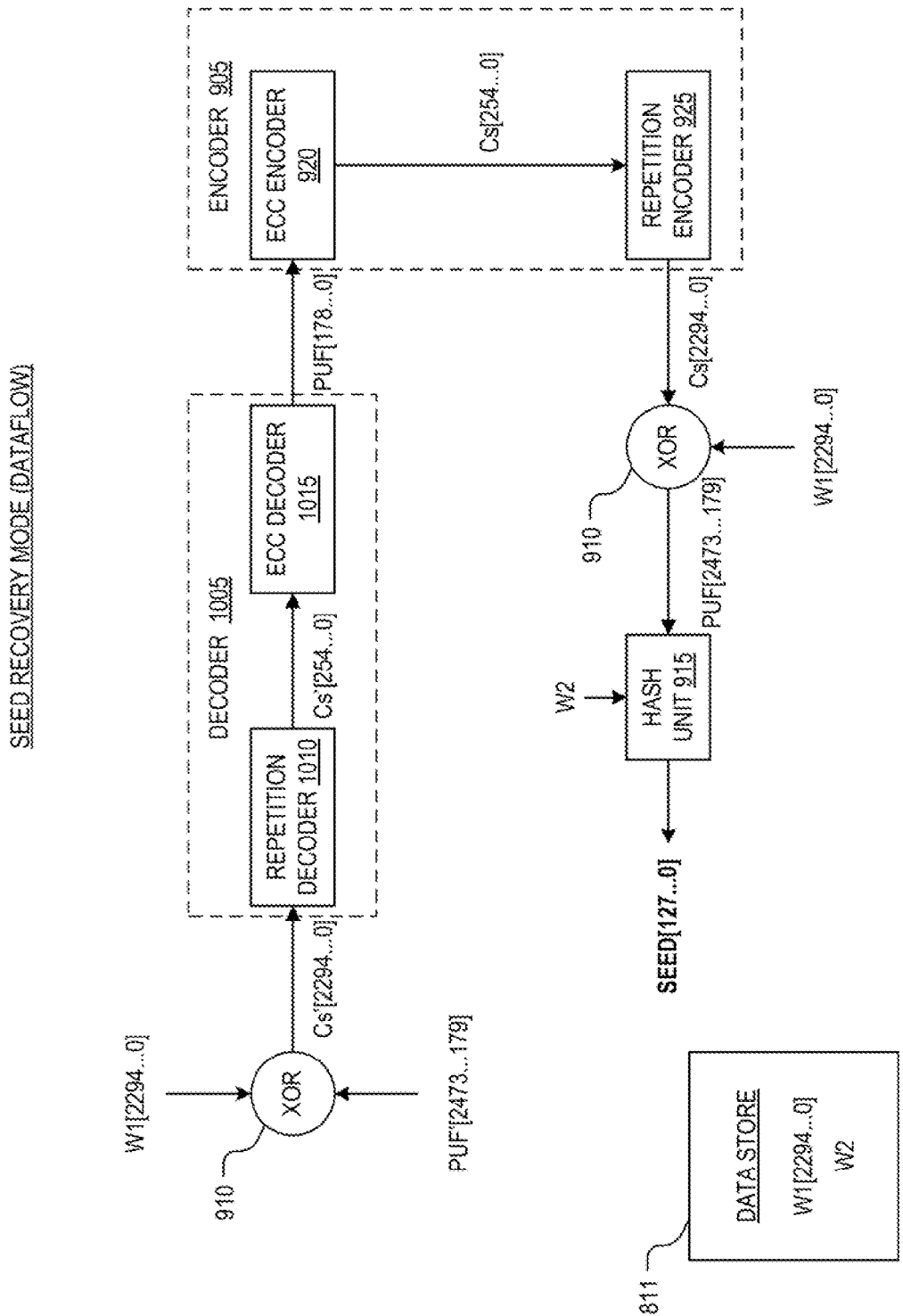
FIG. 10 is a dataflow diagram illustrating a seed recovery mode of a noise reduction circuit during authentication of a device fingerprint, in accordance with an embodiment of the invention.

FIG. 10 is a dataflow diagram illustrating seed recovery mode 813 of noise reduction circuit 810 during authentication of the device fingerprint, in accordance with an embodiment of the invention. During seed recovery mode 813, noise reduction circuit 810 is configured to include two logic units 910, a decoder 1005, encoder 905, and hash unit 915. The illustrated embodiment of decoder 1005 includes a repetition decoder 1010 and an ECC decoder 1015.

Noise reduction circuit 810 may be configured to operate in the seed recovery mode 813 by enabling hardware components to implement the dataflow illustrated in FIG. 10. The dataflow illustrated in FIG. 10 may be achieved by loading/executing software/firmware modules, by reconfiguring interconnections between the components, some combination thereof, or otherwise. Each component illustrated in FIG. 10 may be implemented entirely in hardware, entirely in software, or a combination of both.

During operation of the seed recovery mode 813, PUF circuit 805 is enabled and its output PUF value measured. Since the PUF value is a noisy value, this measured value may not be identical to the original PUF value measured during seed generation mode 812. Accordingly, this subsequent measured PUF value is labeled as PUF' and the error correcting codeword generated based on PUF' is labeled as Cs' in FIG. 10.

A first portion of the PUF' value PUF'[2473 . . . 179] is combined by logic unit 910 with the helper data W1[2294 . . . 0] to generate the codeword Cs'[2294 . . . 0]. If PUF' happens to be identical to PUF, then Cs' would be equal to Cs. However, if PUF' is a noisy value with at least one flipped bit, then PUF' does not equal PUF and error correcting techniques will remove the errors and regenerate the original PUF value PUF[2473 . . . 0] and the original seed value SEED[127 . . . 0].

Repetition decoder 1010 decodes Cs'[2294 . . . 0] down to Cs'[254 . . . 0], which is input into ECC decoder 1015 to generate the original PUF[178 . . . 0]. With the original first portion of the PUF value in hand, PUF[178 . . . 0] is inserted back into encoder 905 to generate the original codeword Cs[2294 . . . 0]. With Cs[2294 . . . 0] in hand, logic unit 910 is once again used to combine Cs[2294 . . . 0] with helper data W1[2294 . . . 0] stored in data store 811 to regenerate the original second portion of the PUF value PUF[2473 . . . 179]. Finally, hash unit 915 uses the second portion of the PUF value to recreate the original seed value SEED[127 . . . 0]. If a fixed hash algorithm is not used, then helper data W2 is retrieved from data store 811 to select the appropriate hash algorithm.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computing device, comprising:
    a hardware platform;
    device circuitry coupled to perform a primary function of the computing device disposed in or on the hardware platform; and
    a cryptographic fingerprint unit coupled to authenticate the hardware platform including:
        a physically unclonable function ("PUF") circuit disposed in or on the hardware platform, the PUF circuit coupled to output a PUF value;
        a plurality of programmable PUF perturbation devices coupled to one or more signal paths within the PUF circuit or disposed adjacent to the one or more signal paths, wherein the programmable PUF perturbation devices influence delays associated with the one or more signal paths based on a programmed state of the PUF perturbation devices;
        a key generator coupled to generate a private key and a public key based on the PUF value; and
        a decryptor coupled to receive an authentication challenge posed to the computing device and encrypted with the public key and coupled to output a response to the authentication challenge decrypted with the private key.

2. The computing device of claim 1, wherein the computing device comprises an integrated circuit disposed within a semiconductor die, wherein the device circuitry and the PUF circuit are integrated into the semiconductor die.

3. The computing device of claim 1, further comprising a noise reduction circuit coupled between the PUF circuit and the key generator, the noise reduction circuit coupled to receive the PUF value, to reduce uncertainty in the PUF value, and to output a seed value to the key generator based on the PUF value.

4. The computing device of claim 3, wherein the noise reduction circuit includes a seed generation mode, wherein during the seed generation mode the noise reduction circuit comprises:
    an encoder coupled to the PUF circuit to receive a first portion of the PUF value and to generate an error correcting codeword ("ECC") based on the first portion of the PUF value, the ECC for reducing the uncertainty in the PUF value; and
    a hash unit coupled to the PUF circuit to receive a second portion of the PUF value and to generate the seed value for coupling to the key generator.

5. The computing device of claim 3, wherein the noise reduction circuit includes a seed recovery mode, wherein during the seed recovery mode the noise reduction circuit comprises:
a first logic circuit coupled to combine the PUF value with helper data according to a logic function to generate a first codeword;
a decoder coupled to decode the first codeword;
an encoder coupled to the decoder to re-encode the first codeword to generate a second codeword;
a second logic circuit coupled to combine the second codeword with the helper data according to the logic function to re-create a second portion of the PUF value; and
a hash unit coupled to the second logic circuit to re-create the seed value based on the second portion of the PUF value re-created by the second logic circuit.

6. The computing device of claim 1, wherein the hardware platform comprises a field programmable gate array ("FPGA") and the PUF circuit comprises a plurality of cross-coupled inverters disposed within the FPGA.

7. The computing device of claim 1, wherein the programmable PUF perturbation devices comprise anti-fuses.

8. The computing device of claim 1, wherein the hardware platform comprises at least one of a semiconductor die, an application specific integrated circuit, a field programmable gate array, or a printed circuit board.

9. The computing device of claim 1, wherein the programmable PUF perturbation devices are reprogrammable PUF perturbation devices.

10. The computing device of claim 1, wherein the programmable PUF perturbation devices are accessible to be programmed by a user.

11. The computing device of claim 1, wherein the programmable PUF perturbation devices are accessible to be programmed by the cryptographic fingerprint unit.

12. A method for cryptographically fingerprinting a hardware device, the method comprising:
generating a physically unclonable function ("PUF") value using a PUF circuit disposed within the hardware device;
selecting an error correction code ("ECC") codeword for reducing noise in a second portion of the PUF value based upon a first portion of the PUF value;
generating a seed value for seeding the cryptographic function based on the second portion of the PUF value;
seeding a cryptographic with the seed value;
generating a cryptographic key from the cryptographic function; and
storing the cryptographic key associated with an identifier of the hardware device as a device fingerprint for future use by a challenger to authenticate the hardware device using a cryptographic challenge and response.

13. The method of claim 12, wherein storing the cryptographic key associated with the identifier comprises:
storing the cryptographic key associated with the identifier in a device fingerprint list which includes device fingerprints for a plurality of hardware devices, wherein the device fingerprint list is external to the hardware device.

14. The method of claim 13, further comprising certifying the device fingerprint list with a certifying authority.

15. The method of claim 12, wherein generating the cryptographic key comprises:
generating the cryptographic key as a public key of a private-public key pair.

16. The method of claim 12, wherein the identifier of the hardware device comprises a serial number of the hardware device.

17. The method of claim 12, further comprising:
randomly generating the identifier within the hardware device.

18. The method of claim 17, wherein the identifier is generated based upon at least a portion of the PUF value.

19. The method of claim 17, wherein the identifier is generated based upon a second PUF value generated using a second PUF circuit disposed within the hardware device, the method further comprising:
comparing the identifier against a list of previously selected identifiers to determine if a collision occurs; and
if the collision occurs, then programming a perturbation device linked to the second PUF circuit to change the second PUF value.

20. The method of claim 12, wherein generating the PUF value using the PUF circuit disposed within the hardware device comprises generating the PUF value with at least one of an arbiter PUF, ring oscillator PUF, a cross-coupled PUF, or a butterfly PUF.

21. The method of claim 12, further comprising:
programming anti-fuses disposed within the hardware device adjacent or couple to the PUF circuit to influence random delays associated with one or more signal paths of the PUF circuit.

22. The method of claim 12, wherein the PUF value and the seed value are not stored within the hardware device for future use after seeding the cryptographic function.

23. The method of claim 12, wherein generating the seed value comprises:
hashing the second portion of the PUF value to generate the seed value, wherein a relative bit-width between the second portion of the PUF value and the seed value is selected to achieve a desired entropy value per bit of the seed value.

24. The method of claim 12, wherein the second portion of the PUF value is not derived from the first portion of the PUF value.

25. A method for cryptographically authenticating a hardware device, the method comprising:
programming a PUF perturbation device coupled to one or more signal paths within a PUF circuit or disposed adjacent to the PUF circuit, wherein the programming the PUF perturbation device causes the PUF circuit to output a new PUF value different than a previous PUF value of the PUF circuit, the hardware device including the PUF circuit;
generating a cryptographic key from the new PUF value;
storing the cryptographic key associated with a device identifier of the hardware device as a device fingerprint in a memory;
retrieving the device identifier of the hardware device;
using the device identifier to retrieve a device fingerprint for the hardware device from the memory, the device fingerprint including a public key generated by a key generator seeded with a seed value based on the new PUF value;
encrypting a message with the public key to generate an encrypted message;
challenging the hardware device to decrypt the encrypted message, wherein in response to challenging the hardware device to decrypt the encrypted message, the hardware device enables the PUF circuit to regenerate the new PUF value and the key generator uses the regenerated new PUF value to generate a private key and decrypt the encrypted message using the private key; and determining whether the hardware device has been compromised based upon whether the hardware device is able to decrypt the encrypted message.

26. The method of claim 25, wherein retrieving the device identifier of the hardware device comprises:
   querying the hardware device to obtain a device serial number from the hardware device.

27. The method of claim 25, wherein using the device identifier to retrieve the device fingerprint for the hardware device, comprises:
   accessing a device fingerprint list maintaining a plurality of device fingerprints indexed to a plurality of device identifiers, wherein the device fingerprint list is stored in the memory;
   authenticating a cryptographic signature of the device fingerprint list; and
   obtaining the public key.

28. The method of claim 27, wherein the device fingerprint list is maintained by a third party and accessed via a network.

29. The method of claim 25, wherein challenging the hardware device to decrypt the encrypted message comprises providing a cryptographic challenge to a cryptographic fingerprint unit within the hardware device via a test access port.

* * * * *